United States Patent [19]

Kawamura

[11] Patent Number: 5,513,280
[45] Date of Patent: Apr. 30, 1996

[54] DISCRIMINATION OF AN EDGE PORTION OF AN IMAGE FROM A SCREEN DOT PORTION IN AN IMAGE PROCESSING SYSTEM

[75] Inventor: Naoto Kawamura, Yokohama, Japan

[73] Assignee: Canon Kabushiki Kaisha, Tokyo, Japan

[21] Appl. No.: 446,990

[22] Filed: May 22, 1995

Related U.S. Application Data

[60] Continuation of Ser. No. 103,209, Aug. 9, 1993, abandoned, which is a division of Ser. No. 6,123, Jan. 19, 1993, Pat. No. 5,251,267, which is a continuation of Ser. No. 642,434, Jan. 17, 1991, abandoned, which is a division of Ser. No. 378,488, Jul. 12, 1989, Pat. No. 5,029,227, which is a continuation of Ser. No. 188,712, Apr. 29, 1988, abandoned, which is a continuation of Ser. No. 901,825, Aug. 29, 1986, abandoned.

[30] Foreign Application Priority Data

| Aug. 30, 1985 | [JP] | Japan | 60-189941 |
| Aug. 30, 1985 | [JP] | Japan | 60-189942 |
| Aug. 30, 1985 | [JP] | Japan | 60-189943 |

[51] Int. Cl.⁶ .................................................. G06K 9/36
[52] U.S. Cl. ........................... 382/266; 358/447; 358/455
[58] Field of Search ................................... 382/199, 266; 358/443, 447, 453, 455, 462, 532; H04N 1/40

[56] References Cited

U.S. PATENT DOCUMENTS

| 4,506,382 | 3/1985 | Hada et al. | 382/27 |
| 4,595,956 | 6/1986 | Kawamura et al. | 358/283 |
| 4,763,199 | 8/1988 | Suzuki | 358/280 |
| 4,786,976 | 11/1988 | Takao et al. | 358/283 |
| 4,800,442 | 1/1989 | Riseman et al. | 358/280 |
| 4,811,037 | 3/1989 | Arai | 346/108 |
| 4,819,066 | 4/1989 | Miyagi | 355/14 E |
| 4,847,654 | 7/1989 | Honma et al. | 358/300 |
| 4,847,695 | 7/1989 | Arai | 358/455 |
| 4,870,499 | 9/1989 | Suzuki et al. | 358/443 |
| 4,873,537 | 10/1989 | Ohta | 346/108 |
| 4,897,734 | 1/1990 | Sato | 358/448 |
| 4,953,114 | 8/1990 | Sato | 382/50 |
| 4,980,757 | 12/1990 | Nishigaki | 358/75 |
| 5,018,024 | 5/1991 | Tanioka | 358/457 |
| 5,023,919 | 6/1991 | Wataya | 382/54 |
| 5,218,649 | 6/1993 | Kundu et al. | 382/54 |
| 5,231,677 | 7/1993 | Mita et al. | 382/22 |

FOREIGN PATENT DOCUMENTS

| 1192601 | 8/1985 | Canada | 358/455 |
| 62-42693 | 2/1987 | Japan | H04N 9/79 |

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

There is provided an image processing apparatus comprising an image signal generator having a first processing unit for processing the image signal in a first mode and generating a first processed signal, a discriminator for discriminating characteristics of the image signal, the discriminator having a selector for selecting the first processed signal according to a discrimination result; and a pulse width modulated signal generator for processing the first processed signal from the selector by using a pattern signal and for generating a pulse width modulated signal.

12 Claims, 14 Drawing Sheets

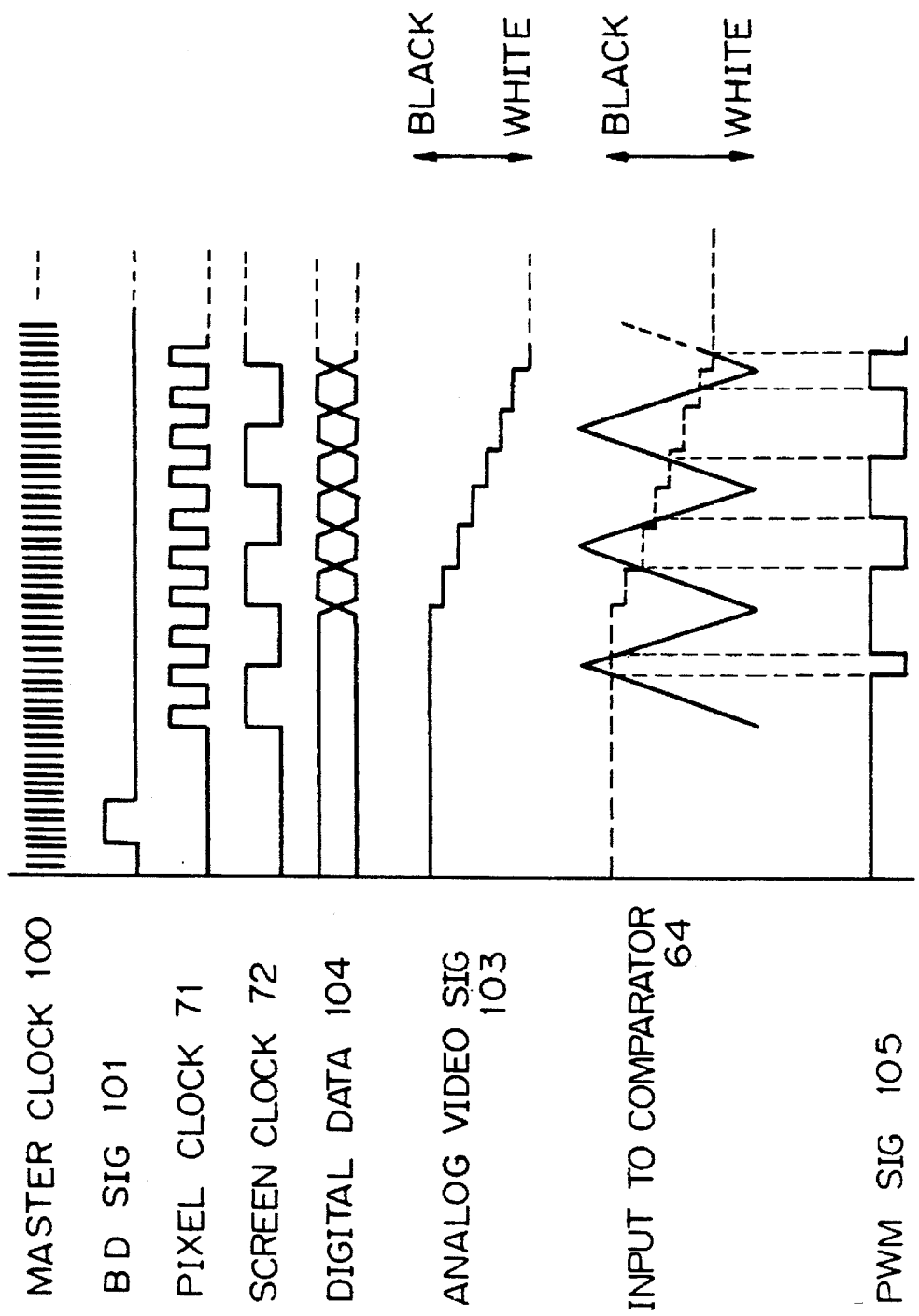

DISCRIMINATION OF AN EDGE PORTION OF AN IMAGE FROM A SCREEN DOT PORTION IN AN IMAGE PROCESSING SYSTEM

This application is a continuation of application Ser. No. 08/103,209 filed Aug. 9, 1993, abandoned, which is a division of application Ser. No. 08/006,123 filed Jan. 19, 1993, U.S. Pat. No. 5,251,267, which was a continuation of application Ser. No. 07/642,434, filed Jan. 17, 1991, abandoned, which was a division of application Ser. No. 07/378,488, filed Jul. 12, 1989, U.S. Pat. No. 5,029,227, which was a continuation of application Ser. No. 07/188,712, filed Apr. 29, 1988, abandoned, which is a continuation of application Ser. No. 06/901,825, filed Aug. 29, 1989, abandoned.

BACKGROUND OF THE INVENTION

1. Field of the Invention

The present invention relates to an image processing apparatus for reproducing an image of high quality.

2. Related Background Art

Dither and density pattern methods using a threshold matrix have been known as typical conventional methods of binarizing images including halftone areas. If an image consisting of a character/line image and a halftone image is binarized, the character/line image is partially omitted. Even if a screen dot image is binarized, a moire pattern is formed by a beat between the periodic dot pattern and the periodic threshold matrix pattern, thus greatly degrading the image quality.

SUMMARY OF THE INVENTION

It is an object of the present invention to eliminate the conventional drawbacks described above.

It is another object of the present invention to improve an image processing apparatus.

It is still another object of the present invention to provide an image processing apparatus capable of reproducing an image of high quality.

It is still another object of the present invention to provide a simple image processing apparatus capable of reproducing an image of high quality.

It is still another object of the present invention to provide an image processing apparatus capable of reproducing an image of high quality at high speed.

It is still another object of the present invention to provide an image processing apparatus capable of accurately reproducing an original image.

It is still another object of the present invention to improve an image processing apparatus with an image discrimination function.

The above and other objects, features, and advantages of the present invention will be apparent from the following detailed description and the appended claims in conjunction with the accompanying drawings.

BRIEF DESCRIPTION OF THE DRAWINGS

FIG. 15 is a block diagram showing an arrangement of a buffer memory in FIG. 14;

FIG. 16 is a table showing a matrix of a Laplacian filter for recognizing the type of image;

FIG. 20 is a timing chart for explaining pulse width modulation in the apparatus of FIG. 20.

DETAILED DESCRIPTION OF THE PREFERRED EMBODIMENTS

Preferred embodiments of the present invention will be described in detail with reference to the accompanying drawings.

First Embodiment

Figure 1:
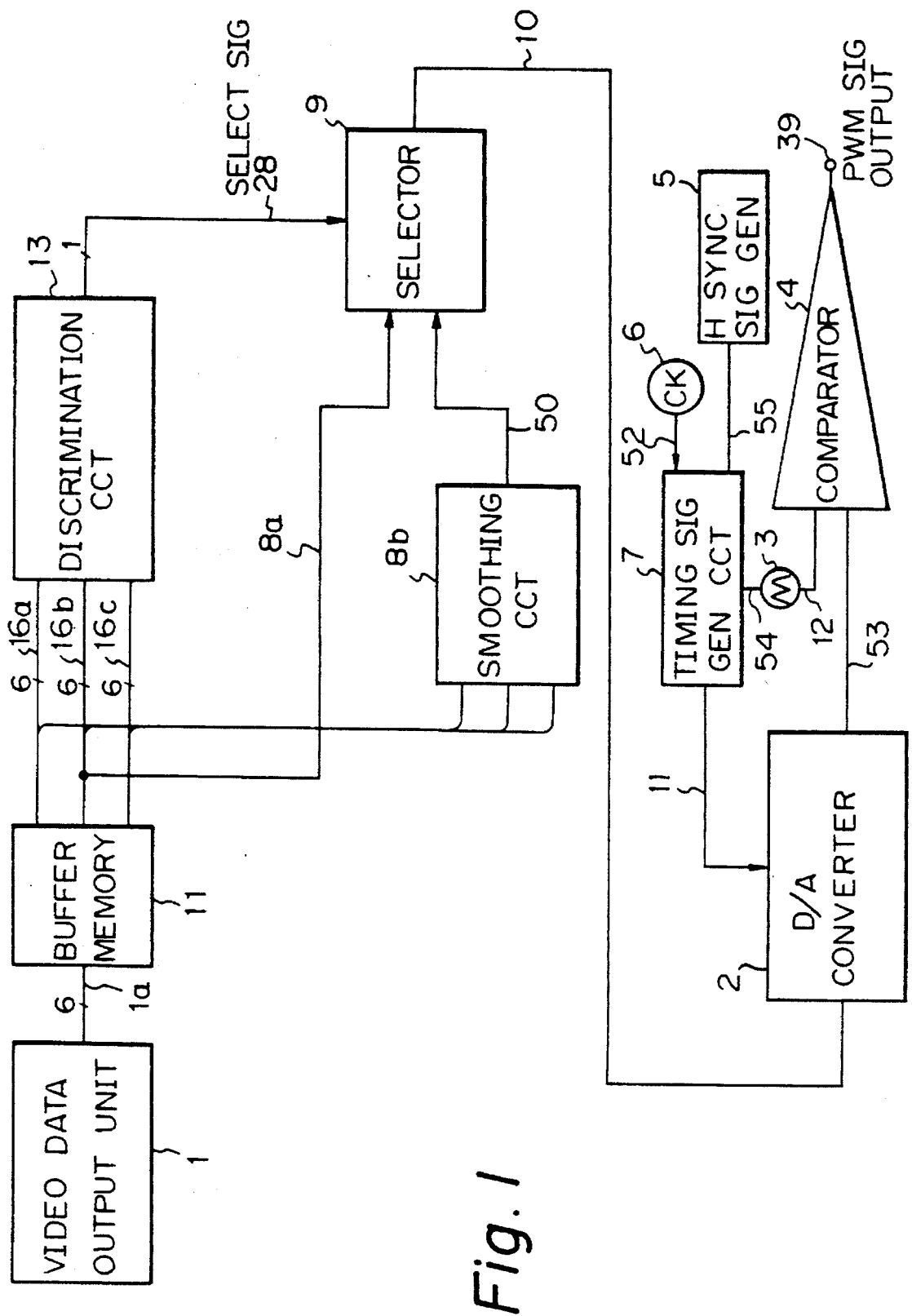
FIG. 1 is a block diagram of an image processing apparatus according to a first embodiment of the present invention.
Figures 2, 3A, 3B:
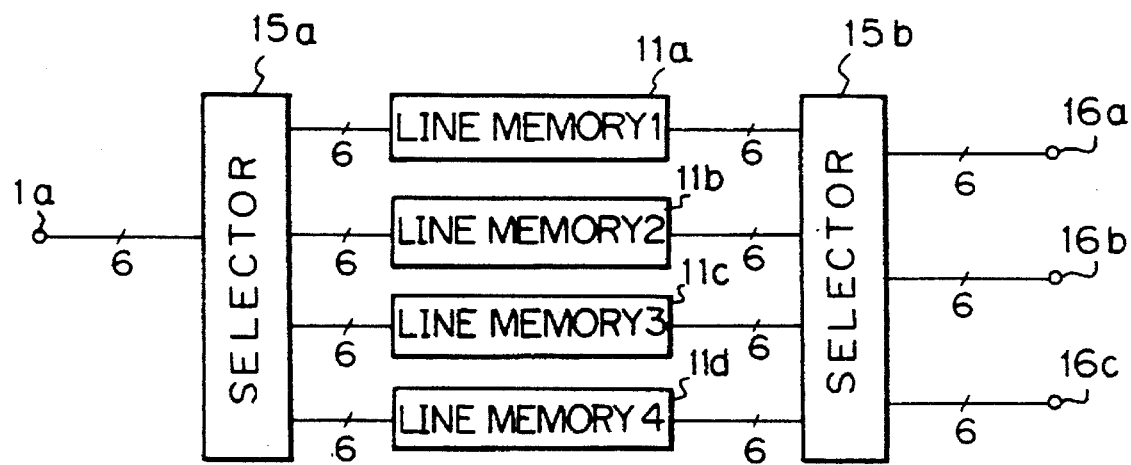
FIG. 2 is a block diagram showing an arrangement of a buffer memory in FIG. 1.
FIGS. 3A and 3B are respectively tables showing matrices of a primary differential filter.

FIG. 1 schematically shows an image processing apparatus according to a first embodiment of the present invention. Referring to FIG. 1, the apparatus includes a video data output unit 1. The video data output unit 1 A/D-converts image data from a CCD sensor (not shown) or a video camera (not shown) into digital image data 1a representing density information and having a predetermined number of bits (six bits in this embodiment). The digital image data 1a may be temporarily stored in a memory (not shown) or may be input from an external device through a transmission line or the like. The image data 1a from the digital data output unit 1 is 6-bit image data which is input to a buffer memory 11. As shown in FIG. 2, the buffer memory 11 comprises four line memories 11a to 11d. One line of the input image data 1a is selected by a selector 15a and is written in the selected line memory. Image signals are read out by a selector 15b from three other line memories which are not set in the write mode and store the image signals. The readout signals are output as image signals 16a, 16b and 16c, respectively. The write operation of the line memories is sequentially performed in the order of 11a, 11b, 11c and 11d. Therefore, the output image signals 16a to 16c serve as continuous three-line image data. Since the four line memories are arranged, the write and read operations can be simultaneously performed.

The outputs (16a, 16b and 16c) from the corresponding line memories are input to a smoothing circuit 8b. At the same time, some of the original signals in the line memories (i.e., image data 8a of the central pixel) are extracted, and the extracted data is input to one input terminal of a selector 9. An output of the smoothing circuit 8b is connected to the other terminal of the selector 9. A selection signal input to the selector 9 is a SELECT signal 28 from a discrimination circuit 13. The operation of the discrimination circuit 13 will be described later on.

An output signal 10 from the selector 9 is converted by a digital-to-analog converter (D/A converter) 2 into an analog signal. Pixels represented by the analog signal are sequentially input to one input terminal of a comparator 4 one by one. A pattern signal generator 3 generates a triangular pattern signal 12 for every predetermined number of pixels of the digital data. The triangular pattern signal 12 is input to the other input terminal of the comparator 4.

A master clock 52 is generated by an oscillator (master clock generator) 6 in response to a horizontal sync signal 55 .generated from an HSYNC generator 5. The master clock 52 is counted down into a ¼ period by a timing signal generation circuit 7 so that the master clock 52 becomes a pixel clock 11. The pixel clock 11 is used as a transfer clock of the image data and the latch timing clock for the D/A converter 2. It should be noted that the HSYNC signal may be generated internally or externally. Since this embodiment is applied to the laser beam printer, the HSYNC signal corresponds to a known beam detection (BD) signal. The BD signal is a signal representing a beam scanning position.

Pulse Width Modulation Processing

The comparator 4 compares the level of a D/A-converted image signal 53 with that of the triangular pattern signal 12 and generates a PWM output signal 39. The PWM signal 39 is input to a modulator (e.g., a laser driver 32 of FIG. 7) for modulating a laser beam is turned on/off in response to a pulse width to form a halftone image on a recording medium (e.g., a photosensitive drum 38).

Figure 5:
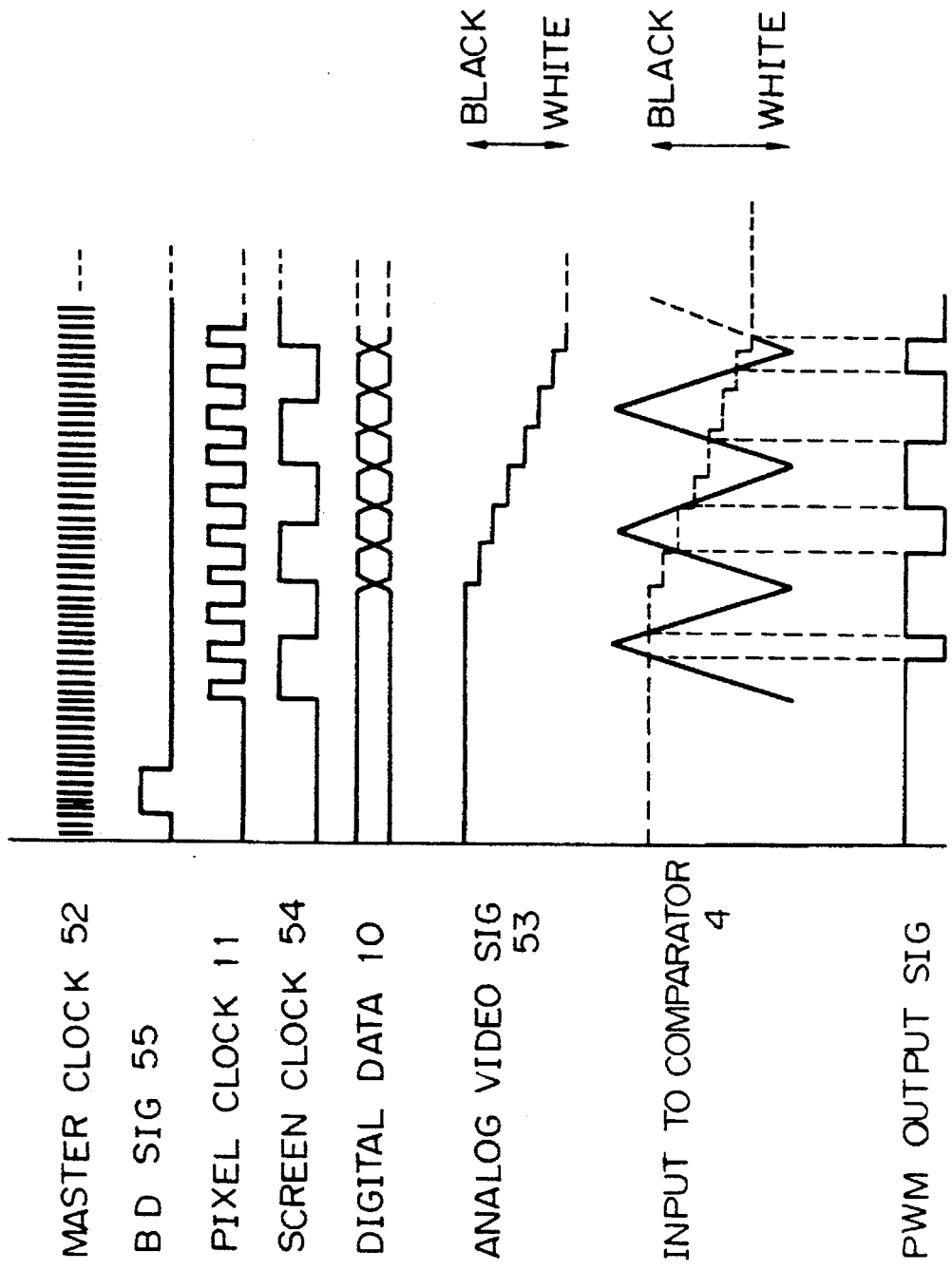
FIG. 5 is a timing chart for explaining pulse width modulation in the apparatus of FIG. 1.

FIG. 5 is a timing chart showing waveforms of signals generated in the components of the apparatus in FIG. 1. Referring to FIG. 5, the master clocks 52 are outputs from the oscillator 6, and the BD signal 55 is the HSYNC signal. The pixel clocks 11 are obtained by causing the timing signal generation circuit 7 to count down the master clocks 52. The pixel clocks 11 are generated by the timing signal generation circuit 7 such that the master clocks 52 are divided at a frequency division ratio of ¼ in synchronism with the HSYNC signal. Screen clocks 54 are further obtained such that the pixel clocks 11 generated by the timing signal generation circuit 7 are further divided therein at a frequency division ratio of ⅓. The screen clocks 54 have a period corresponding to that of three pixel clocks 11. The screen clock 54 is a sync signal for generating the triangular pattern signal 12 and is input to the pattern signal generator 3. The pattern signal generator 3 comprises an integrator including a capacitor and a resistor. The digital data 10 is digital image data (code data) and obtained such that the image signal from the video data output unit 1 is selected as an original image signal or a smoothed image signal according to the type of image (the type represents the characteristics or nature of the image). The analog video signal 53 is image data D/A-converted by the D/A converter 2. As is apparent from FIG. 5, the analog pixel data is output in synchronism with the pixel clock 11. A higher analog level represents a higher density.

The triangular waves 12 as outputs from the pattern signal generator 3 are generated in synchronism with the screen clocks 54, as indicated by the solid line of "INPUT TO COMPARATOR 4" in FIG. 5. Dotted lines in FIG. 5 represent analog image data from the D/A converter 2. The analog image data is compared by the comparator 4 with the triangular waves 12 from the pattern signal generator 3. The image data is converted to PWM binary data, as indicated by a PWM output signal 39 in FIG. 5.

According to PWM processing of this embodiment, digital image data is temporarily converted into analog image data, and the analog data is compared with the triangular wave pulses 12 having a predetermined period, thereby achieving substantially continuous pulse width modulation and hence producing an image output of good gradation characteristics.

According to this embodiment, the master clocks 52 having a frequency (i.e., the frequency 12 times that of the triangular waves) higher than that of the sync signal for generating a pattern signal (e.g., triangular waves) are used to generate the screen clocks 54 synchronized with the horizontal sync signal 55. "Drifting" (e.g., a deviation between the first-line pattern signal and the second-line pattern signal) of the pattern signal (triangular waves) 12 generated by the pattern signal generator 3 is measured as $1/12$ of the pattern signal period. In this manner, density data is substantially continuously PWM-modulated using a pattern signal with little "drifting", thereby reproducing an image of high quality.

The PWM-modulated video output can be a 64-level analog signal if the number of bits of an input to the D/A converter 2 is 6. Therefore, a 64-level PWM output is obtained.

Discimination for Type of Image

The discrimination circuit 13 will be described in detail. FIGS. 3A and 3B show the characteristics of filters used in the discrimination circuit. As is apparent from FIGS. 3A and 3B, primary differential filters are used. A primary differential filter has directivity, as is known to those skilled in the art. In order to detect primary differential values along two dimensional directions, two filters having the characteristics in FIGS. 3A and 3B must be coupled to each other. The discrimination circuit 13 aims at detecting an edge of an image.

Figure 4A:
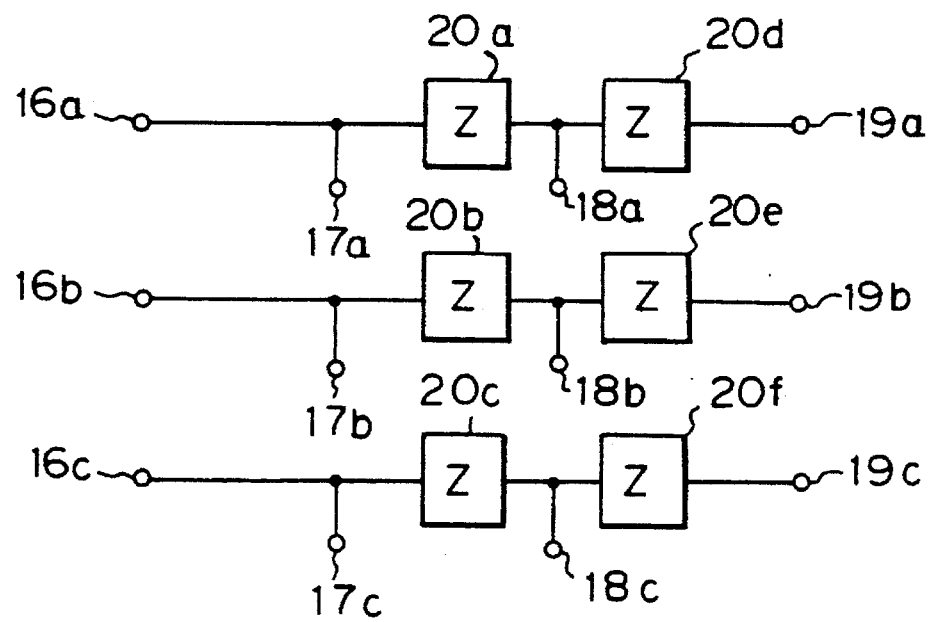
FIGS. 4A to 4D are respectively block diagrams of circuits constituting a discrimination circuit in FIG. 1.

FIG. 4A is a block diagram of a hardware arrangement constituting part of the discrimination circuit for performing filtering operation. The block in FIG. 4A comprises taps 17a to 17c, 18a to 18c, and 19a to 19c corresponding to the respective elements of a 3×3 matrix by using one-pixel clock delay circuits 20a to 20f for receiving the output signals 16a, 16b and 16c from the selector 15b. The circuits in FIGS. 4A to 4D perform arithmetic operations using the outputs from these taps so as to obtain a primary differential filter output as the SELECT signal 28. The circuit in FIG. 4B performs matrix operation corresponding to the matrix in FIG. 3A, and the circuit in FIG. 4C performs matrix operation corresponding to the matrix in FIG. 3B. The circuit in FIG. 4B includes adders 21a, 21b and 22a, and the circuit in FIG. 4C includes adders 21c, 21d, and 22b. These adders are operated according to the signs illustrated in FIGS. 4B and 4C. The circuits in FIGS. 4B and 4C generate outputs 23a and 23b, respectively. These outputs are input to absolute value circuits (ABSs) 24a and 24b shown in FIG. 4D. Outputs from the ABSs 24a and 24b are added by an adder 25. The sum data as digital data from the adder 25 is compared with reference data 27 by a comparator 26. The comparator 26 generates the following outputs according to the conditions:

If X>D, then 1

If X≧D, then 0 where X is the arithmetic operation result, and D is the reference data. If the SELECT signal 28 is set at logic "1", the differential sum is large, and the image signal represents an edge of the image. As described above, the discrimination circuit 13 is constituted by the circuits in FIGS. 4A to 4D.

Smoothing Processing

Figure 6:
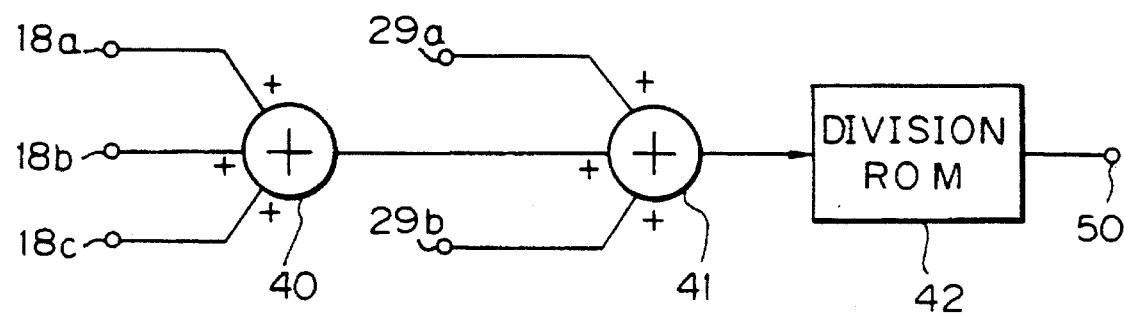
FIG. 6 is a block diagram of a smoothing circuit.

The operation of the smoothing circuit 8b will be described below. In the smoothing circuit 8b, outputs of all taps in FIG. 4A are added and averaged. An average output x is given as follows:

$$x = (1/9)\Sigma xi$$

where xi is nine tap outputs. The circuit diagram of the smoothing circuit 8b is illustrated in FIG. 6. The taps 18a to 18c are added by an adder 40. An output from the adder 40, the tap 29a (i.e., an output from the adder 21a in FIG. 4B) and the tap 29 (i.e., an output from the adder 21b in FIG. 4B) are added by the adder 41. An output from the adder 41 is averaged by a division ROM 42, thereby obtaining an average value output 50.

Figure 4B:
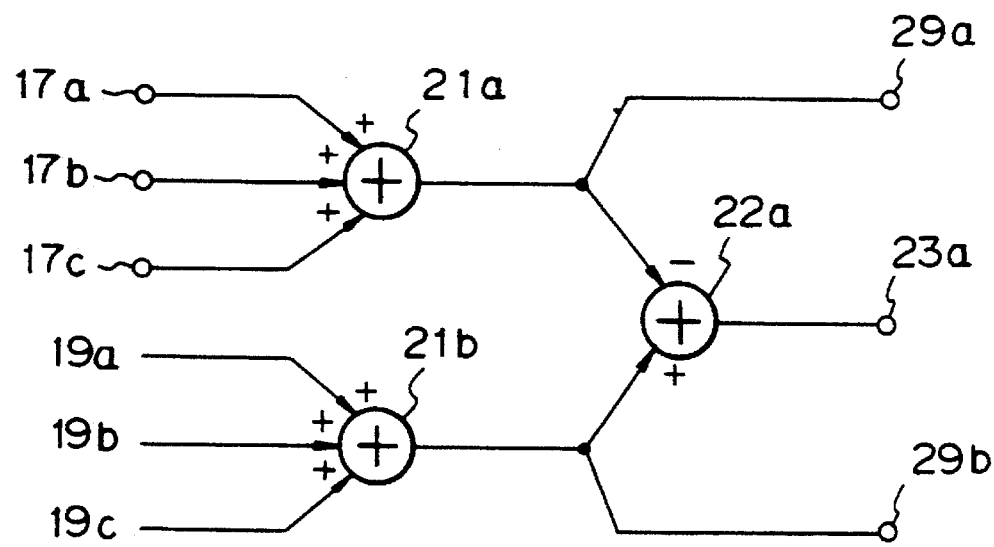
Figure 4C:
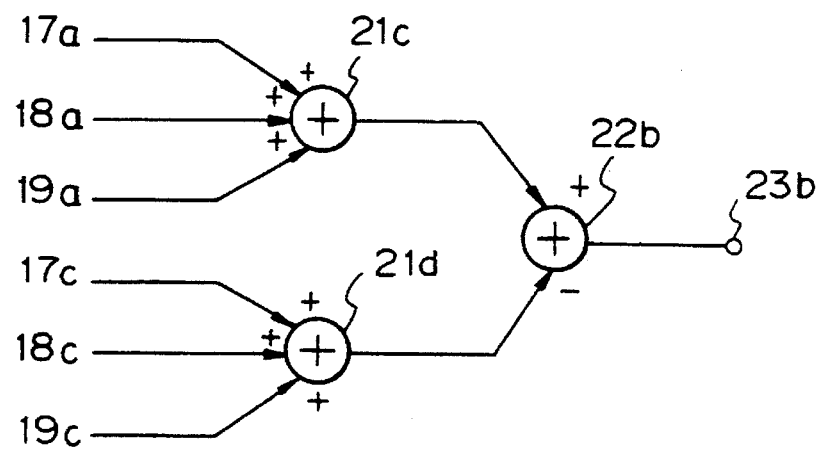
Figure 4D:
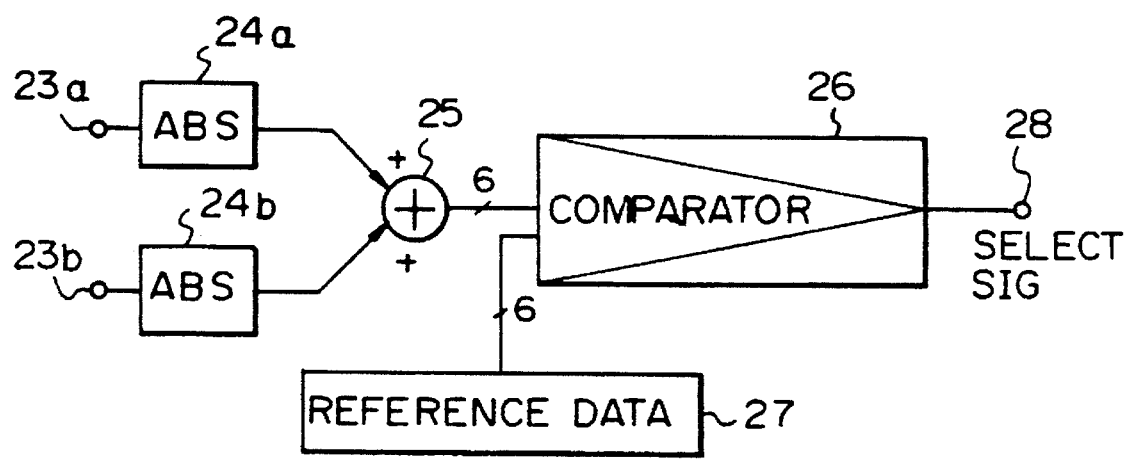

As is apparent from the above description, the smoothing circuit 8b is constituted by the circuits in FIGS. 4A, 4B and 6.

Spatial Filter Characteristics

The frequency characteristics of the two spatial filters (i.e., the primary differential filter and the smoothing filter) are given as follows:

(1) The primary differential filter is designed to have a peak frequency lower than the spatial frequency to prevent the filter from extracting screen dots and to allow it to detect an edge such as a character. This filter is used to detect the type of image.

(2) The smoothing filter passes a low frequency component therethrough (i.e., a low-pass filter). This filter is used to average the image signal components.

Figure 8:
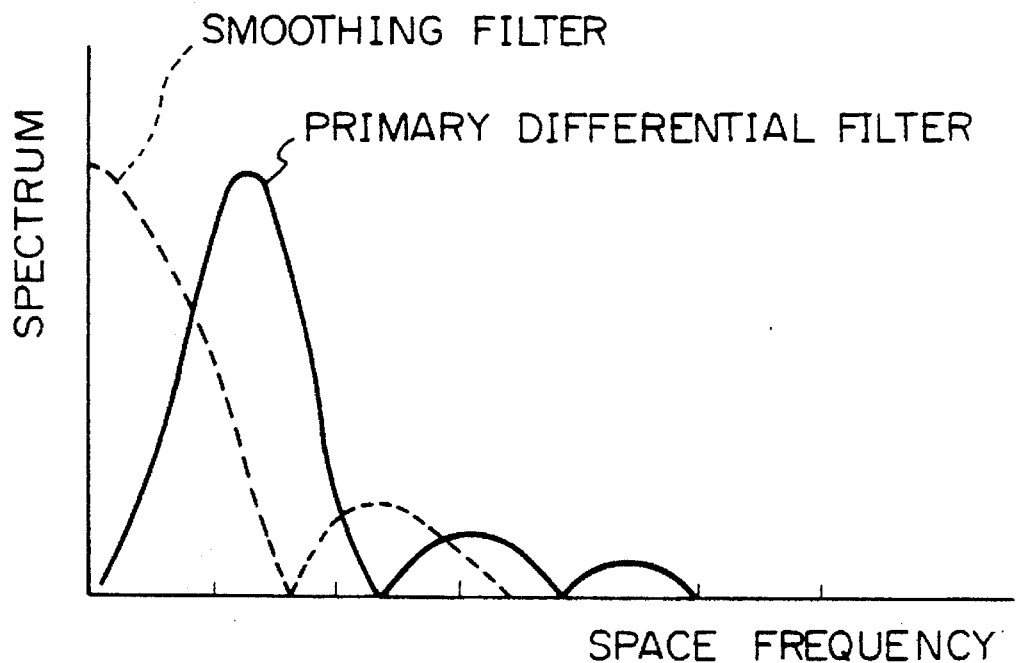
FIG. 8 is a graph showing frequency characteristics of the respective spatial filters.

The frequency characteristics of these filters are shown in FIG. 8. As is apparent from the frequency characteristics in FIG. 8, a total number of signals passing through the band-pass filter (i.e., the primary differential filter) is compared with a predetermined number to detect the type of image.

Figure 9:
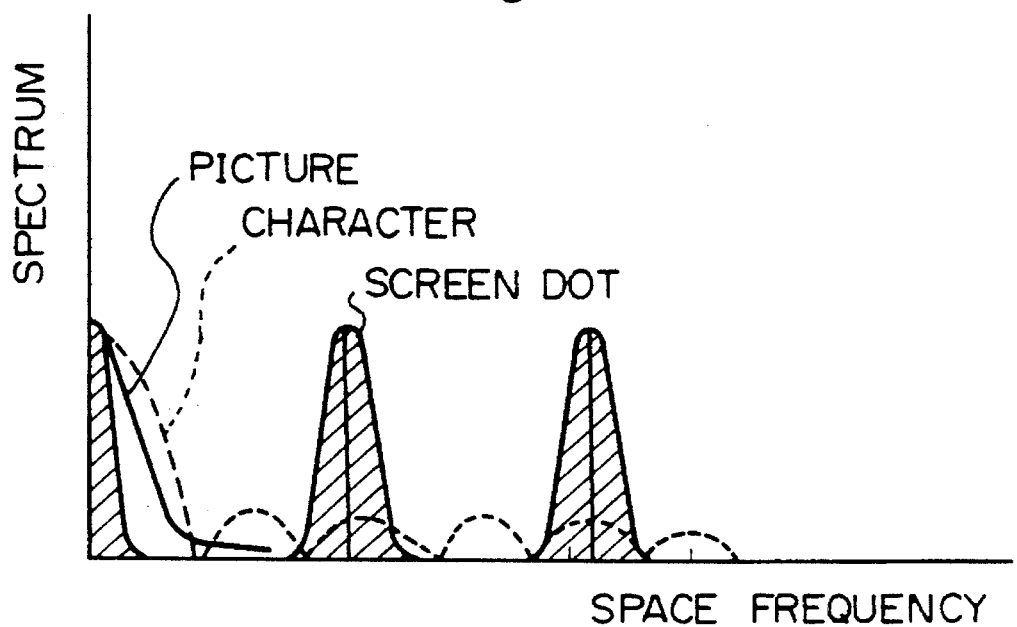
FIG. 9 is a graph showing interval frequency characteristics of different types of images.

FIG. 9 shows spatial frequency spectra of different types of originals. In general, a screen dot original has a periodic steep peak as a function of screen dot pitch.

Image Processing corresponding to Image Recognition

The above description concerning image processing of this embodiment will be summarized as follows:

(1) The peak frequency of the primary differential filter (for recognizing the type of image) is set not to extract the screen dots. An output from this filter determines the type of image. In other words, the output represents an edge such as a character image.

(2) A low level component (i.e., the SELECT signal 28 is set at logic "0", or the area is a halftone or screen dot area) of the output from the primary differential filter is passed through the smoothing filter.

(3) The original signal 8a is output for a high level component (i.e., the SELECT signal 28 is set at logic "1", or the area is a character image area) of the output from the primary differential filter.

The above image processing techniques naturally coincide with the operation of the image processing apparatus in FIG. 1. The above processing derives the following results:

(1) The screen dot image is smoothed. In other words, the periodic characteristic of the screen dot image is eliminated.

(2) The edge of the character/line image is reproduced without being smoothed and without eliminating sharpness.

(3) Smoothing for a picture image is performed according to the presence/absence of the edge. Therefore, a halftone area of the picture is reproduced in such a ways as to be natural.

The discrimination results of the type of image and the filtering results appear as the output 10 from the selector 9 in FIG. 1. Even if the smoothed signal is PWM-modulated a moire pattern is no longer formed, for the following reason. The original image signal is no longer a screen dot signal by smoothing. Even if line screen output is performed, no beam is generated in association with the period of the screen pulses 54.

Figure 7:
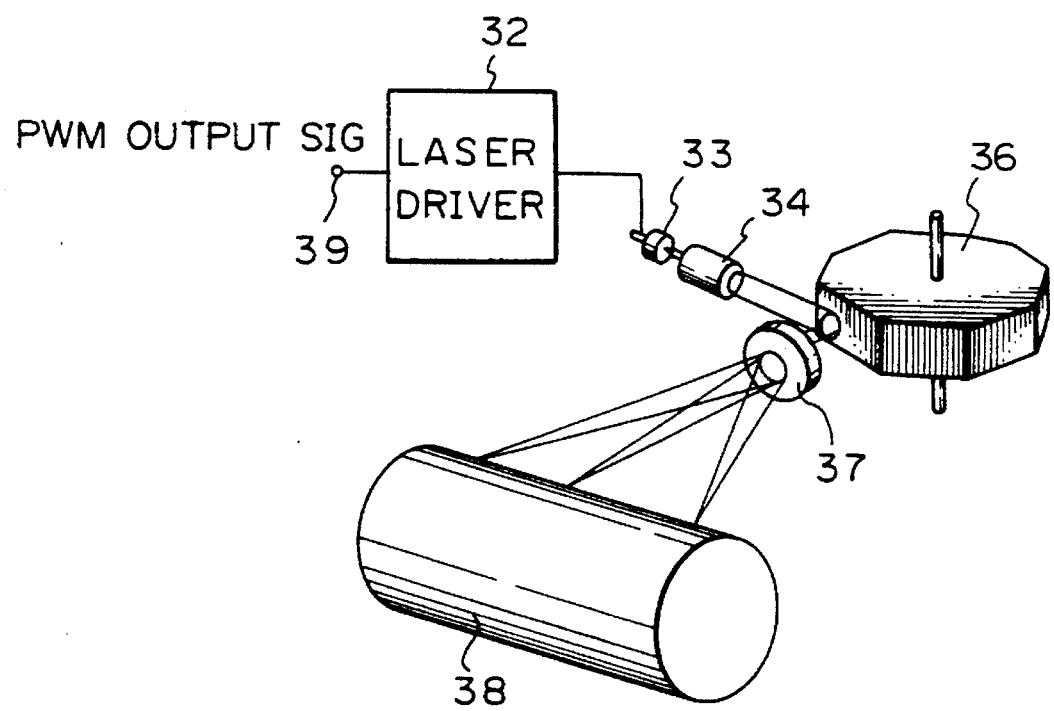
FIG. 7 is a schematic view of a laser beam printer to which the present invention is applied.

FIG. 7 is a case wherein the signal processing results are applied to a laser beam printer. The PWM output signal 39 modulates a laser driver 32 to cause the semiconductor laser to turn on/off. A beam from the semiconductor laser 33 is collimated by a collimator lens 34. The collimated beam is deflected by a polygonal rotating mirror 36, and the deflected beam is focused by an f-θ lens 37 to scan the photosensitive drum 38. The beam pattern on the photosensitive drum becomes a latent image. The latent image is visualized and transferred according to the normal process in the conventional copying machine.

According to this embodiment as described above, an image of high quality can be output regardless of the types of originals.

Since a 64-level PWM signal is output, the discrimination and the smoothing filter are sufficiently effected. For this reason, easy hardware can be designed with a relatively small matrix.

The above embodiment exemplifies an image processing apparatus with a PWM binarizing processing. However, the present invention may also be applicable to binarizing processing by a conventional dither method.

In the above embodiment, the 3×3 matrix is used. However, the size of the matrix is not limited to this. A 5×5 or 7×7 matrix may be used to obtain the same effect as described above. Furthermore, the pattern of the output from the pattern signal generator 3 is not limited to a triangular wave. A sinusoidal wave or a saw-tooth wave may be used in place of the triangular wave.

Second Embodiment

Figure 10:
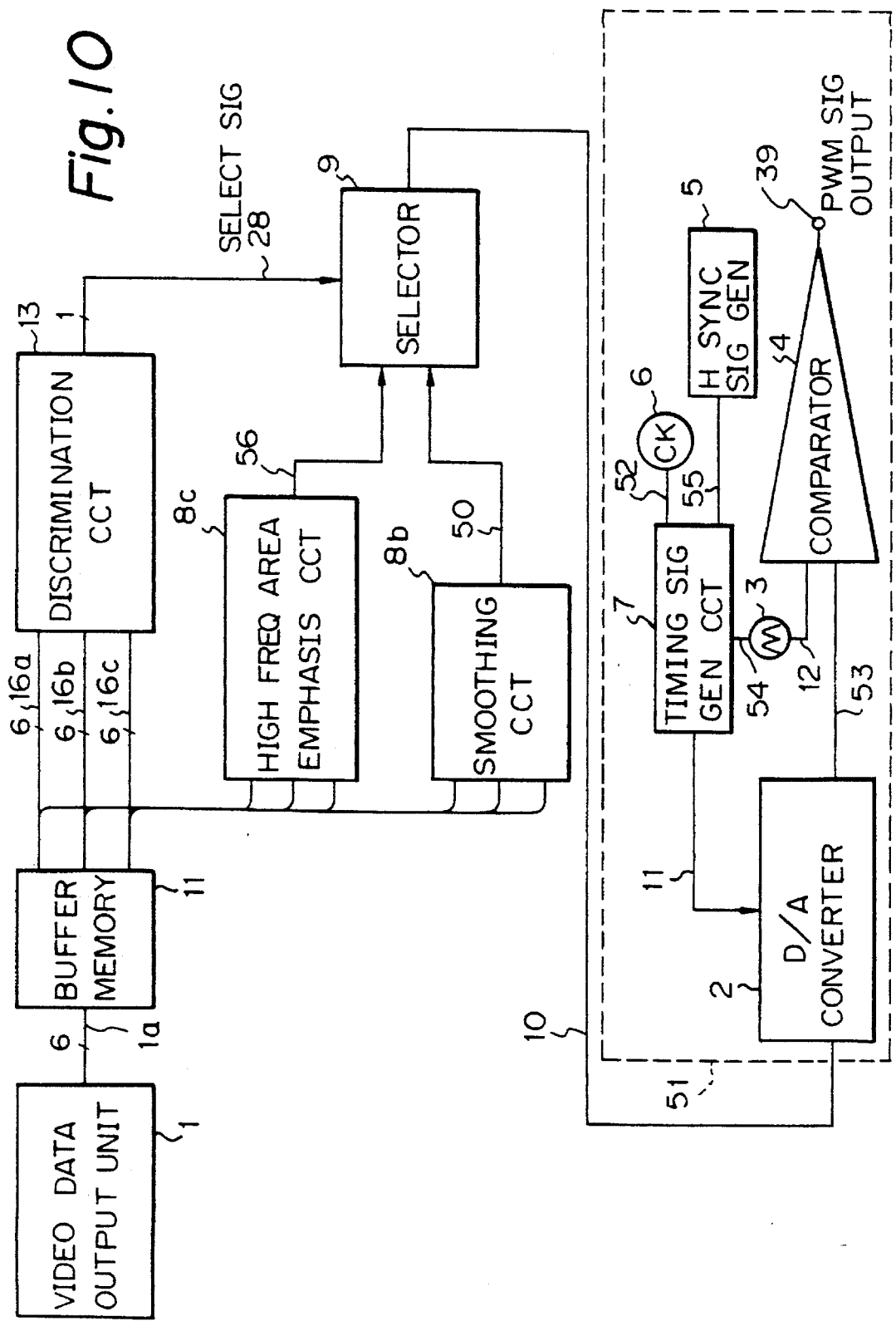
FIG. 10 is a block diagram of an image processing apparatus according to a second embodiment of the present invention.

FIG. 10 schematically shows an image processing apparatus according to a second embodiment of the present invention. The same reference numerals as in FIG. 1 denote the same functions and parts in FIG. 10, and a detailed description thereof will be omitted. The descriptions made with reference to FIGS. 2, 3A, 3B, 4A to 4D, 5, 6, 7, 8 and 9 may be applied to the apparatus in FIG. 10. A main difference between the image processing apparatuses in FIGS. 1 and 10 lies in the fact that a high frequency area emphasis circuit 8c is added to the apparatus of FIG. 10.

Outputs (16a, 16b and 16c) from line memories in FIG. 2 are input to the high frequency area emphasis circuit 8c and a smoothing circuit 8b. An output signal 56 obtained by emphasizing high frequency areas of the signals 16a, 16b and 16c and an output signal 50 obtained by smoothing the signals 16a, 16b and 16c are input to a selector 9. The selection signal input to the selector 9 is a SELECT signal 28 from a discrimination circuit 13.

According to the second embodiment, digital data 10 is digital image data (i.e., code data) and is output as the image signal 56 whose high frequency area is emphasized or the smoothed signal 50 according to the type of image (the type represents the characteristics or nature of the image).

High Frequency Area Emphasis

Figure 11:
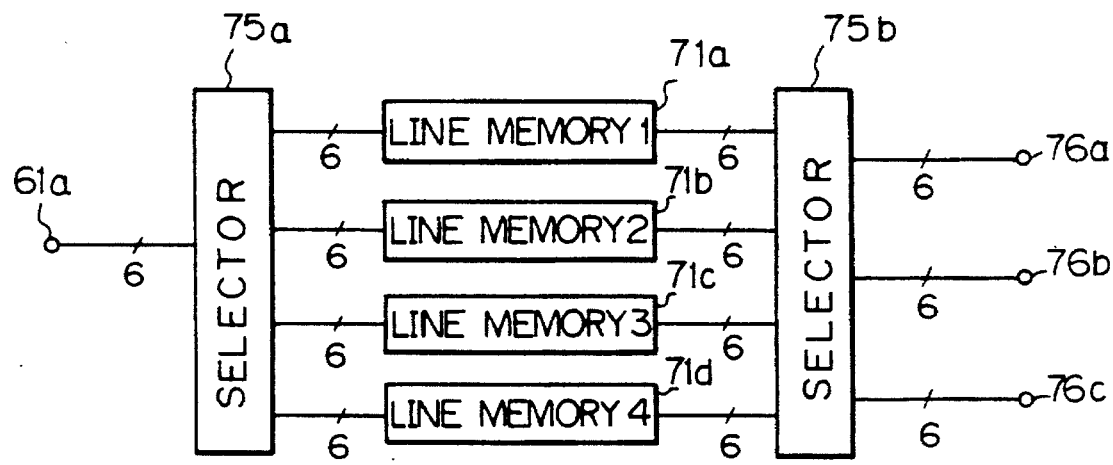
FIG. 11 is a table showing a matrix of a high frequency area emphasis spatial filter.
Figure 12:
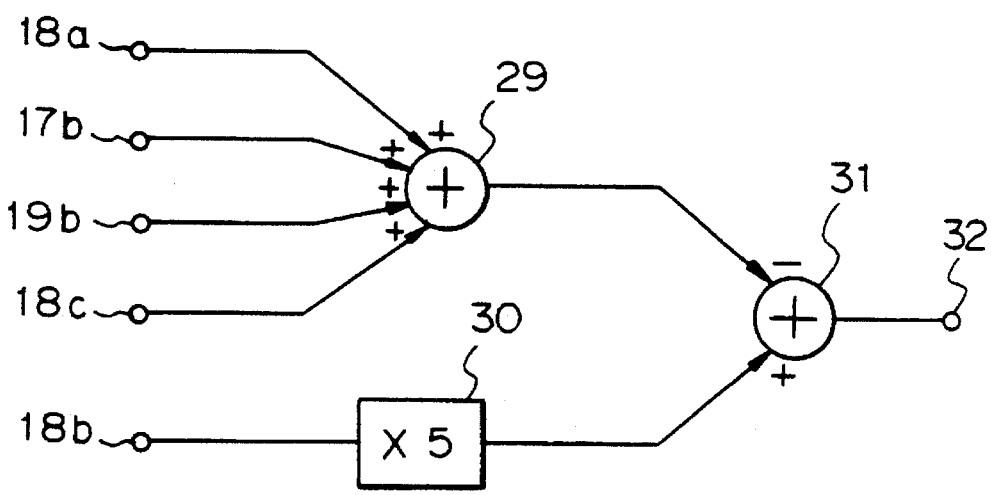
FIG. 12 is a block diagram of a circuit for realizing the spatial filter in FIG. 11.

FIG. 11 shows the characteristics of a spatial filter for performing high frequency area emphasis in the high frequency area emphasis circuit 8c. The spatial filter is normally constituted by a Laplacian filter for emphasizing the edge of the image. Such a filter has characteristics of a high-pass filter. FIG. 12 shows a hardware circuit for performing spatial filtering using tap outputs from a tap circuit in FIG. 4A. Four signals (i.e., 18a, 17b, 19b and 18c) of (−1) coefficients are added by an adder 29. The data 18b of the central pixel is multiplied with 5 by a multiplier 30. A sum signal from the adder 29 is subtracted from the output from the multiplier 30 by an adder 31 to obtain an output 32. In other words, the output from the adder 31 corresponds to the image signal 56. As is apparent from the above description, the high frequency area emphasis circuit 8c is constituted by the circuits in FIG. 4A and 12.

Spatial Filter Characteristics

The frequency characteristics of the three spatial filters (i.e., the primary differential filter, the Laplacian filter, and the smoothing filter) used in the second embodiment are summarized as follows:

(1) The Laplacian filter extracts the highest space or spatial frequency (a high-pass filter). This filter is used to emphasize the high frequency area.

(2) The smoothing filter extracts the lowest frequency (a low-pass filter). This filter is used to average the image signal components.

(3) The primary differential filter extracts a middle frequency range (a band-pass filter). This filter is used for recognition for the type of image.

Figure 13:
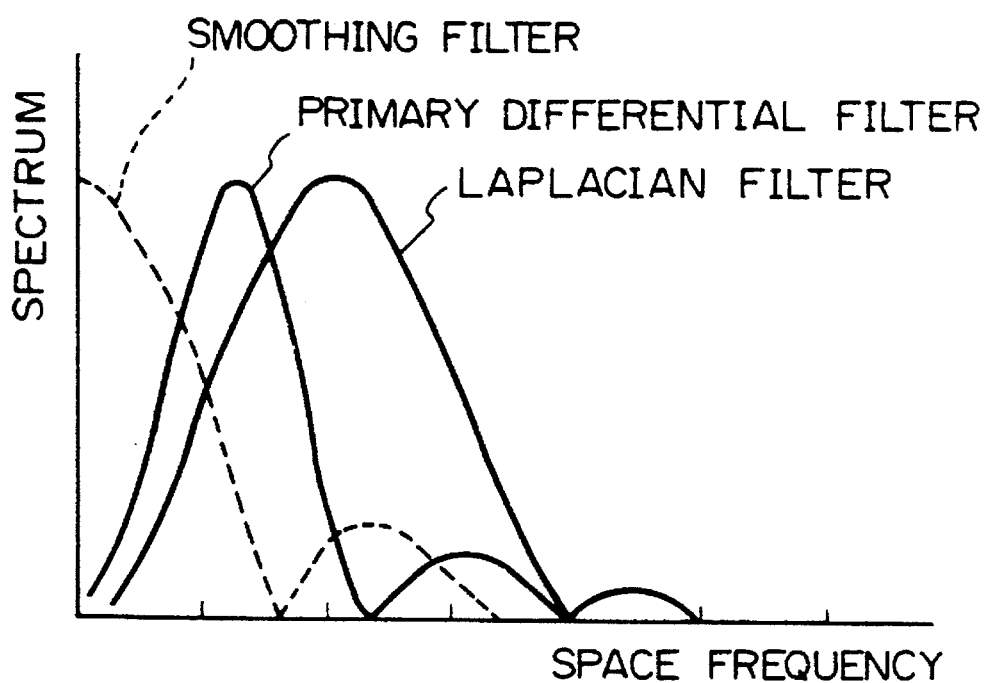
FIG. 13 is a graph showing frequency characteristics of the respective spatial filters.

FIG. 13 shows characteristics of the three types of filters. As is apparent from the frequency characteristics in FIG. 13, a total number of signals passing through the band-pass filter (i.e, the primary differential filter) is compared with a predetermined number to represent the type of image.

As previously described, FIG. 9 shows the spectra of the respective originals as a function of spatial frequency. In general, the screen dot original has a steep periodic peak as a function of the screen dot pitch.

Image Processing Corresponding to Image Recognition

The above description associated with image processing of the second embodiment will be summarized as follows:

(1) The peak frequency of the primary differential filter (for recognizing the type of image) is set not to extract the screen dots. An output from this filter determines the type of image. In other word, the output represents an edge such as a character image.

(2) The Laplacian filter is operated (high frequency area emphasis) for a high level component (i.e., the area is an edge area such as a character) of the output from the primary differential filter. Therefore, sharpness of the edge is emphasized.

(3) A low level component (i.e., an area is a halftone or screen dot area) of the output from the primary differential filter is passed through the smoothing filter.

The image processing techniques coincide with the operation of the image processing apparatus in FIG. 10. The above processing yields the following results:

(1) The screen dot image is smoothed. In other words, the periodic characteristic of the screen dots is eliminated.

(2) The edge of the character/line image is emphasized to improve sharpness of the image and increase its resolution.

(3) Smoothing and emphasis are performed for the picture image according to the presence/absence of the edge. Therefore, the halftone area of the picture is reproduced to be natural.

The processed results appear as an output 10 from a selector 9 in FIG. 10. since the periodic characteristic is eliminated from the screen dot original, no beat between the screen dot pattern and screen clocks 54 is generated. Therefore, no moire pattern is formed, and the character/line image is not partially omitted.

The laser beam printer shown in FIG. 7 may be used in the second embodiment.

According to the second embodiment described above, an image of high quality can be reproduced regardless of the type of image. In particular, the resolution at the edge is improved.

Since a 64-level PWM signal is output, the discrimination operation and the smoothing filter provide sufficient effects. For this reason, hardware can be designed with a relatively small matrix.

The above embodiment exemplifies an image processing apparatus with a PWM binarizing processing. However, the present invention may also be applicable to binarizing processing by a conventional dither method.

In the above embodiment, the 3×3 matrix is used. However, the size of the matrix is not limited to this. A 5×5 or 7×7 matrix may be used to obtain the same effect as described above. Furthermore, the pattern of the output from the pattern signal generator 3 is not limited to a triangular wave. A sinusoidal wave, a saw-tooth wave or the like may be used in place of the triangular wave.

Third Embodiment

Figure 14:
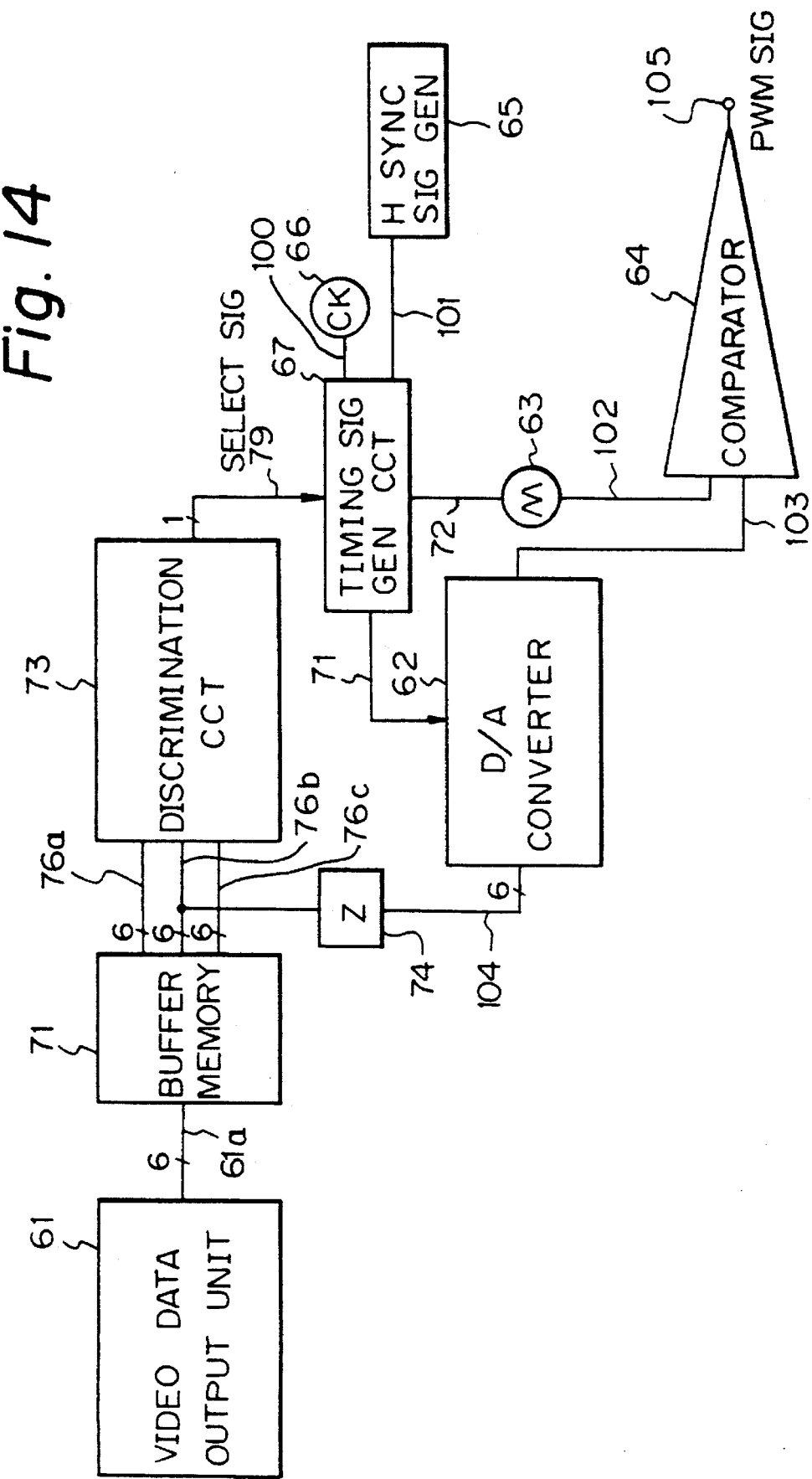
FIG. 14 is a block diagram of an image processing apparatus according to a third embodiment of the present invention.

FIG. 14 schematically shows an image processing apparatus according to a third embodiment of the present invention. The apparatus includes a video data output unit 61. The unit 61 receives image data from a CCD sensor (not shown) or a video camera (not shown) and A/D-converts it into digital image data 61a representing density information and having a predetermined number of bits (six bits in this embodiment). The digital image data 61a may be temporarily stored in a memory (not shown) or may be sent from an external device through a communication line or the like. Image data 61a from the video data output unit 61 is 6-bit data, as shown in FIG. 14, and is input to a buffer memory 71. The buffer memory 71 is used to extract a desired pixel from the image data so as to discriminate the type of image. A discrimination circuit 73 discriminates the type of image (the type represents the characteristics or nature of the image) and outputs a SELECT signal 79 according to the discriminated type of image. The SELECT signal 79 is input to a timing signal generator 67 to change the frequency of screen clocks 72. The screen clocks 72 are input to a pulse pattern generator 63. Screening in this embodiment is performed such that pattern pulses 102 having a predetermined waveform are compared with image data 103 D/A-converted by a D/A converter 62 in response to the screen clocks 72 to binarize the image data 103 according to pulse width modulation. In this case, the frequency of the screen clocks 72 determines the coarseness of "screening" for the image data 103.

Operation of Buffer Memory

The buffer memory 71 comprises line memories 71a to 71d, as shown in FIG. 15. One line of the image data 61a is selected by a selector 75a. The selected line data is written in the selected line memory. Image signals are read out by a selector 75b from the remaining line memories which are not set in the write mode. The readout signals serve as image signals 76a, 76b, and 76c. The write operation of the line memories is performed in the order of 71a, 71b, 71c, and 71d. Therefore, the image signals 76a to 76c constitute three continuous 3-line image data. Since the four line memories are so arranged, the write and read operations are simultaneously performed.

Discrimination for Type of Image

Figure 17A:
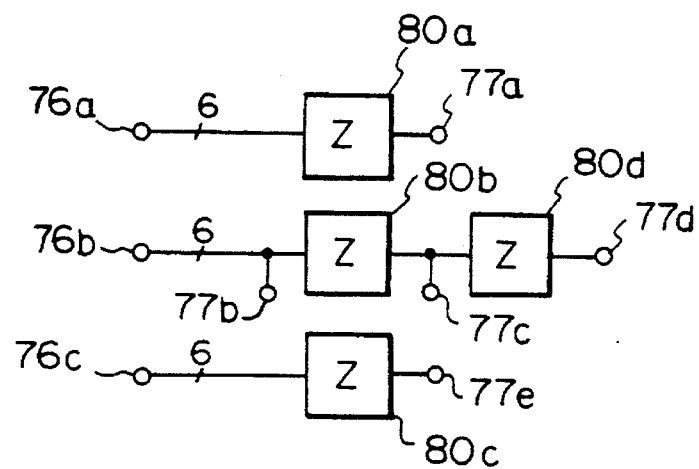
FIGS. 17A and 17B are respectively block diagrams of circuits constituting a discrimination circuit in FIG. 14.
Figure 17B:
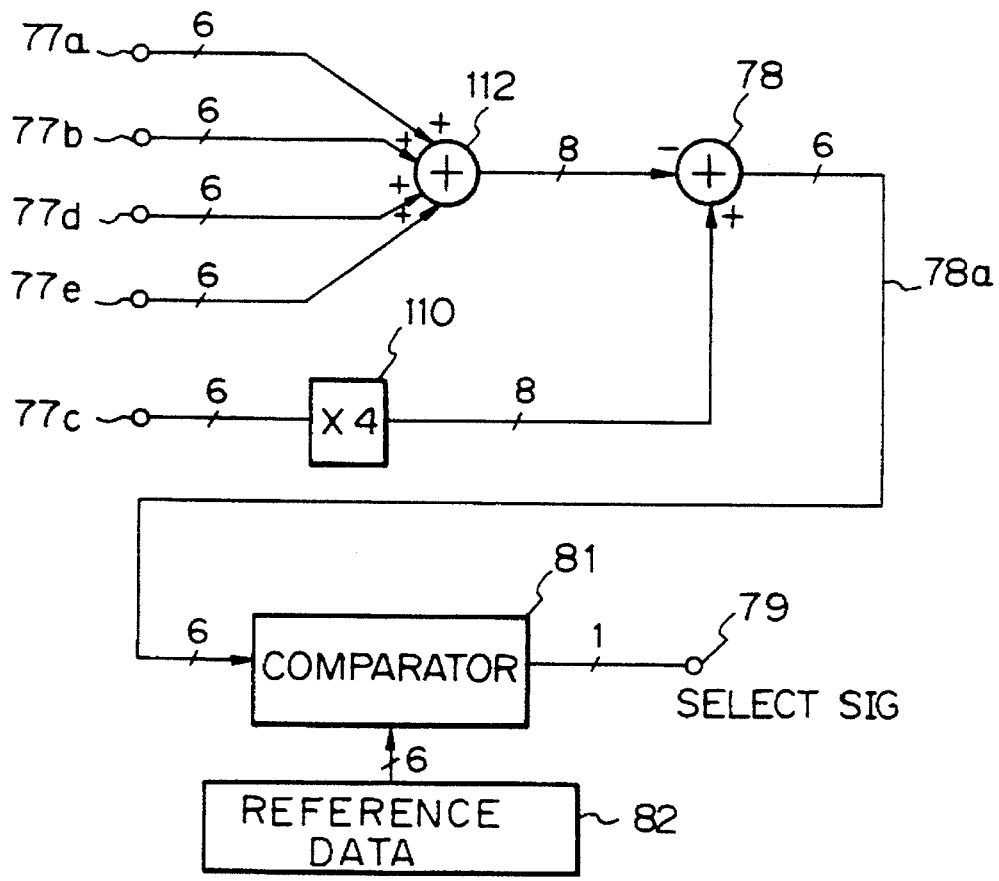

The output signals from the line memories are input to the discrimination circuit 73 shown in FIG. 14. The discrimination circuit 73 preforms discrimination for the type of image so as to detect an edge of an image upon operation of the Laplacian filter, the characteristics of which are shown in FIG. 16. The hardware arrangements of the Laplacian filter are shown in FIGS. 17A and 17B. Image signals 76a, 76b, and 76c of each line are delayed by delay circuits 80a to 80d each having a delay time corresponding to one pixel clock period. These delayed signal appear at taps 77a to 77e, respectively. The filter matrix elements which are not "0" in FIG. 16 correspond to the taps, respectively. The outputs from the taps, i.e., the outputs (77a, 77b, 77d, and 77e) corresponding to the "−1" coefficients are added by an adder 112 shown in FIG. 17B. The output (77c) corresponding to the "4" coefficient is multiplied with 4 by a multiplier 110. An output from the adder 112 is subtracted by an adder 78 from the output from the multiplier 110 to obtain the Laplacian output 78a. The Laplacian output 78a represents the edge density level of the image i.e., the "degree" of the edge. The output 78a is compared with reference data 82 by a comparator 81, and the comparator 81 generates a SELECT signal 79. In this case, the logical level of the SELECT signal 79 as the output from the discrimination circuit 73 is determined as follows:

If (edge density level)>k, then output "1"

If (edge density level)≦k, then output "0" the SELECT signal 79 is a binarized output. In this case, the parameter "k" can be arbitrarily determined by reference data 82. The discrimination circuit 73 discriminates the type of image for the eight image data constituting areas around the image data of the tap 77c. The discrimination result is output as the SELECT signal 79. If the number of levels for discriminating the type of image is increased, e.g., if the parameter "k" may take a plurality of values, the SELECT signal 79 has a bit length consisting of a plurality of bits, thereby achieving fine discrimination for the type of image.

Screen Pulse

The SELECT signal 79 is input to a timing signal generation circuit 67. The timing signal generation circuit 67 generates image clocks 71 and screen clocks 72. The timing signal generation circuit 67 will be described in more detail below.

Figures 18, 19:
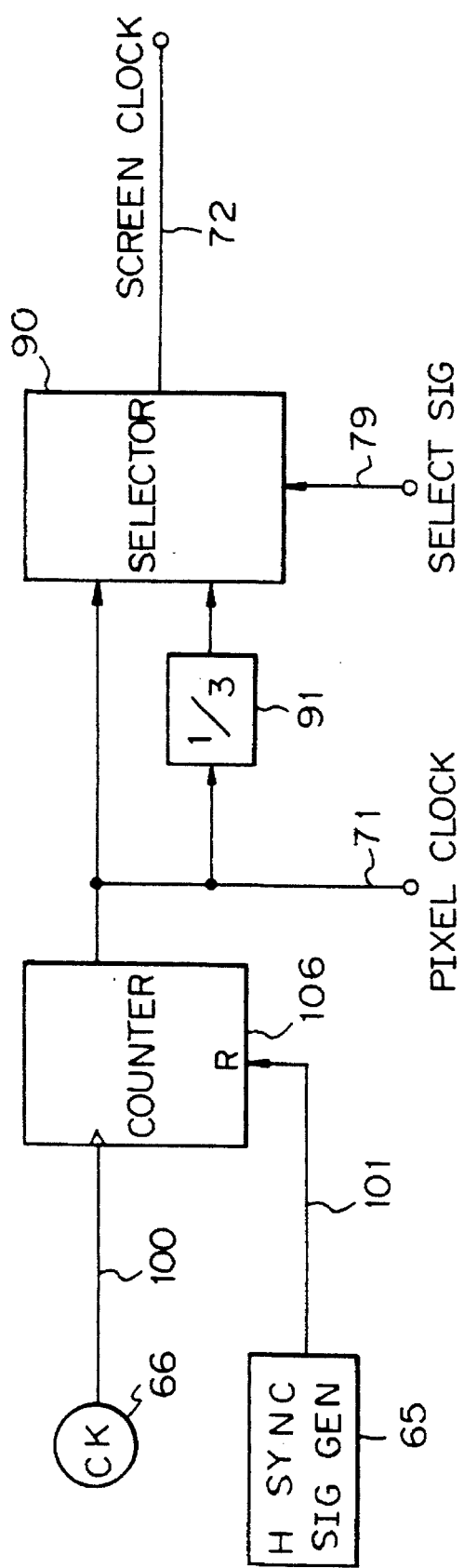
FIG. 18 is a block diagram of a timing signal generator in FIG. 14.
FIG. 19 is a table showing a matrix of another Laplacian filter.

FIG. 18 is a block diagram of the timing signal generation circuit 67. The timing signal generation circuit 67 receives master clocks 100, the SELECT signal 79, and an HSYNC signal 101 and generates the pixel clocks 71 and the screen clocks 72. The pixel clocks 71 are generated by a counter 106 in response to the HSYNC signal 101 generated from an HSYNC generator 65 in units of scanning lines. The HSYNC signal may be generated internally or supplied externally. This embodiment is applied to the laser beam printer, so that the HSYNC signal corresponds to a known beam detected (BD) signal.

The master clocks 100 are counted down by the counter 106 so that the pixel clocks 71 are generated. The count-down rate is determined according to the degree of "drifting" occurring for each line of screen clocks 72. In this embodiment, the master clocks 100 are counted down at a frequency division ratio of ¼. In other words, each pixel clock 71 is generated for every four master clocks 100. The pixel clocks 71 are used as the transfer clocks for the image data and the latch timing clocks for the D/A converter 2. A "⅓" frequency divider 91 further counts down the pixel clocks 71 at a frequency division ratio of ⅓. Clocks 111 are output from the frequency divider 91. Each clock 111 is generated for every three pixel clocks 71. A selector 90 selects the pixel clocks 71 or the clocks 111 having a period three times that of the pixel clock 71. The clocks selected by the selector 90 serve as the screen clocks 72. As described above, the SELECT signal 79 is set at logic "1" for the edge of the image. However, the SELECT signal 79 is set at logic "0" for the non-edge of the image. Therefore, the screen clocks 72 are selected in the following manner:

Pixel Clock 71 for Edge of Image or

⅓ Frequency-Divided Clock 111 for Non-edge of Image

The screen clocks 72 are converted by the pattern pulse generator 63 into pattern pulses 102 having a predetermined waveform. In this embodiment, the pattern pulses are converted into triangular waves. The pattern pulses are input to a comparator 64 to binarize the image data according to PWM (Pulse Width Modulation).

PWM Binarizing Processing

For the sake of simplicity for PWM operation, the screen clocks 72 are the clocks 111, obtained by ⅓ frequency-dividing the pixel clocks 71.

Image data of the central pixel in the area whose type is discriminated is an output at the tap 77c. This output is delayed by a one-pixel delay time by a delay circuit 74 and is synchronized with the pattern clock 102. The delayed signal is converted into an analog signal by a D/A converter 62. The pixels of the analog signal are sequentially input to one input terminal of a comparator 64 one by one. The comparator 64 compares the level of the analog image signal 103 with that of the pattern pulses 102 such as triangular wave pulses, thereby obtaining a PWM signal 105. The PWM signal 105 is input to a modulator (e.g., a laser driver 32 in FIG. 7) for modulating the laser beam. The laser beam is turned on/off according to the pulse width, so that a halftone image is formed on the recording medium (i.e., a photosensitive drum 38).

FIG. 20 is a timing chart for explaining the waveforms of the signals in the components of the apparatus in FIG. 14. Referring to FIG. 20, the master clocks 100 are outputs from an oscillator 66, and the BD signal is the HSYNC signal. The pixel clocks 71 are obtained by counting down the master clocks 100 from the oscillator 66 by the timing signal generation circuit 67. In other words, the pixel clocks 71 are obtained such that the timing signal generation circuit 67 ¼ frequency-divides the master clocks 100 in synchronism with the HSYNC signal. The screen clocks 72 are obtained such that the timing signal generation circuit 67 further counts down the pixel clocks 71 at a frequency division ratio of ⅓. In other words, the screen clocks 72 have a period three times that of the pixel clocks 71. The screen clocks 72 serve as a sync signal for generating triangular pattern pulses 102 and are input to the pattern signal generator 63. Digital data 104 is digital image data (i.e., code data) and is output from the video data output unit 61. The analog video signal 103 represents image data D/A-converted by the D/A converter 62. As is apparent from FIG. 20, the analog pixel data are each output in synchronism with the pixel clock 71. It should be noted that a higher analog level corresponds to a higher density.

The triangular pattern pulses 102 as outputs from the pattern signal generator 63 are generated in response to the screen clocks 72, as indicated by the solid line of "INPUT TO COMPARATOR" in FIG. 20, and are input to the comparator 64. The dotted line in FIG. 20 represents analog image data from the D/A converter 62. The comparator 64 compares the analog image data with the triangular pattern pulses 102 from the pattern signal generator 63. The image data is PWM-modulated to obtain a PWM signal 105.

According to PWM processing of the third embodiment, the digital image data is temporarily converted into analog image data, and the analog image data is compared with the pattern pulses 102 having a predetermined period, thereby achieving substantially continuous pulse width modulation and hence obtaining an image output of good gradation characteristics. According to this embodiment, the master clocks 100 having a frequency (i.e., 12 times that of the triangular waves in this embodiment) higher than the sync signal for generating the pattern pulses 102 (the triangular waves in this embodiment) are used to generate the screen clocks 72 synchronized with the HSYNC signal 101. "Drifting" (a deviation between the first- and second-line pattern signals) of the pattern pulses 102 generated by the pattern signal generator 73 becomes $1/12$ of the pattern pulse period. Therefore, density information can be substantially continuously PWM-modulated by using the pattern signal with little "drifting". Therefore, an image of high quality can be reproduced.

The PWM video output provides a 64-level analog output if the D/A converter 62 receives 6-bit input data, so that a 64-level PWM output can be obtained.

In the PWM processing described above, the clocks for determining the comparison rate in the comparator 64 are screen clocks 72. However, if the selector 90 selects the pixel clocks 71, the triangular wave signal in the "INPUT TO COMPARATOR 64" in FIG. 20 is the triangular wave signal having a period equal to that of the one pixel clock 71. Even if the period of the triangular pattern pulse 102 is changed, the comparison operation in the comparator 64 is kept unchanged. Therefore, the last PWM signal waveform is given as follows according to the type of read image Edge of Image:
 PWM output by the pattern pulses 102 synchronized with one pixel clock 71

Non-Edge of Image
 PWM output by the pattern pulses 102 synchronized with three pixel clocks 71

The image output is obtained for the edge image area according to fine screening, and the image output is obtained for the non-edge image area according to coarse screening.

The third embodiment is also applicable to the laser beam printer shown in FIG. 7.

The image processing results of the third embodiment will be summarized below.

The edge portion of the character/line image is detected as an edge signal (the SELECT signal of logic "1") by the discrimination circuit 73. The screen dot image is detected as the edge signal by the discrimination circuit 73 if the image can be clearly detected as screen dots by an input sensor for reading the original. In this case, the output image printed out at a printer is a fine image. On the other hand, the inner area of a character or a halftone area such as a picture is detected as a non-edge signal, thereby obtaining an output with coarse screening.

If a resolution of a printer or the like for outputting a visible image is 400 dots per inch (to be referred to as 400 dpi hereinafter), the line screen of 400 lines per inch is given as 400 lpi. On the other hand, an output of 400/3=133 lpi is suitable for a coarse image output. As a result, all areas of the fine character are represented by the SELECT signals= "1". All outputs are generated at 400 lpi. However, only the edge of the thick character is represented by the SELECT signal 19="1". An output for the outer edge of the character is set at 400 lpi, and an output for the inner area of the character is set at 133 lpi. Therefore, the character/line image or the like is not partially omitted.

The screen dot original is represented by the SELECT signal 19="1", and an output therefor is set at 400 lpi. Therefore, a beat (moire) phenomenon caused by interference between the screen dot original and the output dither pattern can be eliminated for the following reason. A moire pattern is generated by a frequency difference (a difference between the numbers of lines) between the original pattern and the dither pattern. However, since the number of output lines is large, the corresponding frequency difference is increased so that an operator tends not to easily notice the beat phenomenon.

In screening of the above embodiment, the fine image is constituted by the pixel clock 71, and the coarse image is constituted by three pixel clocks. However, the numbers of lines between the fine and coarse images are not limited to these, but may be extended to any numbers which have a large difference.

The Laplacian filter may be constituted by a matrix using all nine pixels in FIG. 19, or a 5×5 matrix excluding a 3×3 matrix. Furthermore, the pattern pulse 102 is not limited to the triangular pulse, but may be extended to a sinusoidal wave, a saw-tooth wave, or the like.

The present invention is not limited to the particular embodiments described above. Various changes and modifications may be made within the spirit and scope of the appended claims.

What is claimed is:

1. An image processing apparatus, comprising:
 a) image signal generating means for generating a digital image signal having multi-bits for each pixel;
 b) discrimination means for discriminating an edge portion of the digital image signals using a plurality of pixels;
 c) emphasizing means for emphasizing the digital image signal of the edge portion discriminated by said discriminating means to generate an output signal; and
 d) pulse-width-modulated signal generating means for modulating the output signal.

2. An apparatus according to claim 1, wherein said pulse-width-modulated signal generating means includes means for converting the digital image signal to an analog image signal, means for generating a pattern signal, and means for comparing the analog image signal with the pattern signal to obtain the pulse-width-modulated signal.

3. An apparatus according to claim 2, wherein the pattern signal is a triangular wave signal.

4. An apparatus according to claim 1, further comprising means for smoothing the digital image signal of a non-edge portion discriminated by said discrimination means.

5. Am image processing apparatus comprising:
 a) image signal generating means for generating a digital image signal having multi-bits for each pixel;
 b) discriminating means for discriminating an edge portion of the digital image signal using a plurality of pixels;
 c) smoothing means for smoothing the digital image signal of a non-edge portion discriminated by said discriminating means to generate an output signal; and d) pulse-width-modulated signal generating means for modulating the output signal to generate a pulse-width-modulated signal.

6. An apparatus according to claim 5, further comprising image forming means for forming an image on the basis of the pulse-width-modulated signal generated by said pulse-width-modulated signal generating means.

7. An image processing method, comprising the steps of:

a) generating a digital image signal having multi-bits for each pixel;

b) discriminating an edge portion of the digital image signals using a plurality of pixels;

c) emphasizing the digital image signal of the edge portion discriminated in said discriminating step to generate an output signal; and d) pulse-width-modulating the output signal.

8. The method according to claim 7, wherein pulse-width modulating the output signal includes converting the digital image signal to an analog image signal, generating a pattern signal, and comparing the analog image signal with the pattern signal to obtain a pulse-width-modulated signal.

9. The method according to claim 8, wherein the pattern signal is a triangular wave signal.

10. The method according to claim 7, including the step of:

smoothing the digital image signal of a non-edge portion discriminated in said discriminating step.

11. An image processing method comprising the steps of:

a) generating a digital image signal having multi-bits for each pixel;

b) discriminating an edge portion of the digital image signal using a plurality of pixels;

c) smoothing the digital image signal of a non-edge portion discriminated in said discriminating step to generate an output signal; and d) pulse-width modulating the output signal to generate a pulse-width-modulated signal.

12. The method according to claim 11, including the step of:

forming an image on the basis of the pulse-width-modulated signal generated in said pulse-width-modulating step.

* * * * *

UNITED STATES PATENT AND TRADEMARK OFFICE
CERTIFICATE OF CORRECTION

PATENT NO. : 5,513,280

DATED : April 30, 1996

INVENTOR(S) : Naoto Kawamura

It is certified that error appears in the above-identified patent and that said Letters Patent is hereby corrected as shown below:

COLUMN 1

Line 15, "Aug. 29, 1989," should read --Aug. 29, 1986,--.

COLUMN 3

Line 27, ".generated" should read --generated--.

COLUMN 5

Line 7, "$X \geq D$," should read --$X \leq D$,--.
　　　Line 53, "corresponding" should read --Corresponding--.

COLUMN 6

Line 14, "ways" should read --way--.

COLUMN 7

Line 54, "word," should read --words,--.

UNITED STATES PATENT AND TRADEMARK OFFICE
CERTIFICATE OF CORRECTION

PATENT NO. : 5,513,280

DATED : April 30, 1996

INVENTOR(S) : Naoto Kawamura

It is certified that error appears in the above-identified patent and that said Letters Patent is hereby corrected as shown below:

COLUMN 8

Line 10, "since" should read --Since--.

COLUMN 9

Line 7, "3-line" should read --lines of--.

COLUMN 12

Line 26, "55x5" should read --5x5--.
Line 58, "Am" should read --An--.

Signed and Sealed this

Eighth Day of October, 1996

Attest:

BRUCE LEHMAN

*Attesting Officer*     *Commissioner of Patents and Trademarks*